US007238941B2

(12) United States Patent
Tai et al.

(10) Patent No.: US 7,238,941 B2
(45) Date of Patent: Jul. 3, 2007

(54) PYROLYZED-PARYLENE BASED SENSORS AND METHOD OF MANUFACTURE

(75) Inventors: Yu-Chong Tai, Pasadena, CA (US); Matthieu Liger, Pasadena, CA (US); Scott Miserendino, Pasadena, CA (US); Satoshi Konishi, Shiga (JP)

(73) Assignee: California Institute of Technology, Pasadena, CA (US)

( * ) Notice: Subject to any disclaimer, the term of this patent is extended or adjusted under 35 U.S.C. 154(b) by 132 days.

(21) Appl. No.: 10/973,938

(22) Filed: Oct. 25, 2004

(65) Prior Publication Data

US 2006/0018360 A1    Jan. 26, 2006

Related U.S. Application Data

(60) Provisional application No. 60/538,594, filed on Jan. 23, 2004, provisional application No. 60/514,627, filed on Oct. 27, 2003.

(51) Int. Cl.
*G01J 5/00* (2006.01)
(52) U.S. Cl. .................................. 250/338.1
(58) Field of Classification Search ............. 250/338.1, 250/330, 332, 338.3, 339.14, 340
See application file for complete search history.

(56) References Cited

U.S. PATENT DOCUMENTS 6,489,616 B2* 12/2002 Giedd ..................... 250/338.1
2002/0134939 A1* 9/2002 Giedd ..................... 250/338.1

OTHER PUBLICATIONS

Beyssac, O., et al., "On the characterization of disordered and heterogeneous carbonaceous materials by Raman spectroscopy," Spectrochimica Acta Part A 59, pp. 2267-2276 (2003).
Hafizovic, S., et al., "Temperature-dependent thermal conductivities of CMOS layers by micromachined thermal van der Pauw test structures", Sensors and Actuators A 97-98, pp. 246-252 (2002).
Howard, P. E., et al., "Advanced High-Performance 320×240 Vox Microbolometer Uncooled IR Focal Plane", Proc. SPIE, vol. 3698, pp. 131-136 (1999).
Hui, E. E., et al., "Carbonized parylene as a conformal sacrificial layer", 8th Solid-State Sensor and Actuator Workshop Technical Digest Hilton Head, pp. 256-260 (1998).

(Continued)

*Primary Examiner*—David Porta
*Assistant Examiner*—Mark R. Gaworecki
(74) *Attorney, Agent, or Firm*—Foley & Lardner LLP

(57) ABSTRACT

A method (and resulting structure) for fabricating a sensing device. The method includes providing a substrate comprising a surface region and forming an insulating material overlying the surface region. The method also includes forming a film of carbon based material overlying the insulating material and treating to the film of carbon based material to pyrolyzed the carbon based material to cause formation of a film of substantially carbon based material having a resistivity ranging within a predetermined range. The method also provides at least a portion of the pyrolyzed carbon based material in a sensor application and uses the portion of the pyrolyzed carbon based material in the sensing application. In a specific embodiment, the sensing application is selected from chemical, humidity, piezoelectric, radiation, mechanical strain or temperature.

22 Claims, 16 Drawing Sheets

OTHER PUBLICATIONS

Jahanzeb, C. M., et al., "A Semiconductor YBaCuO Microbolometer for Room Temperature IR Imaging", IEEE Transactions on Electron Devices, vol. 44, pp. 1795-1801 (1997).

Knippenberg, W. F., et al., "Carbon foam", Phillips tech. Rev. vol. 36, No. 4, pp. 93-103 (1976).

Konishi, S., et al., "Parylene-Pyrolyzed Carbon for Mems Applications", The 17th IEEE Intl. MEMS Conf. (Maastricht, Netherlands) pp. 161-164 (Jan. 15-29, 2004).

Liger, M., et al., "Uncooled All-Parylene Bolometer", The 17th IEEE Intl. MEMS Conf. (Maastricht, Netherlands) pp. 593-596 (Jan. 15-29, 2004).

McConnell, A. D., et al., "Thermal Conductivity of Doped Polysilicon Layers", Journal of Microelectromechanical Systems, vol. 10, No. 3, pp. 360-369 (Sep. 2001).

Ranganathan, S., et al., "Photoresist-derived for microelectromechanical Systems and Electrochemical applications", Journal of the Electrochemical Society, vol. 147, No. 1 pp. 277-282 (2000).

Tabata, O., et al., "Mechanical property measurements of thin-films using load deflection of composite rectangular membranes", Sensors and Actuators, vol. 20, pp. 135-141 (1989).

Tissot, J. L., et al., "Advanced IR detector technology development at CEA/LETI", Infrared Phys. & Tech. vol. 43, pp. 223-228 (2002).

Tuinstra, F., et al., "Raman spectrum of graphite," J. Chem. Phys., vol. 53, No. 3,pp. 1126-1130 (1970).

von, Arx, M., et al., "Process-Dependent Thin-Film Thermal Conductivities for Thermal CMOS MEMS", vol. 9, No. 1, pp. 136-145 (Mar. 2000).

Wang, X., et al., "A Parylene Micro Check Valve", DigestTech Papers MEMS'99 Conf., pp. 177-182 (1999).

PCT International Search Report for PCT/US04/35985, 1 page.

* cited by examiner

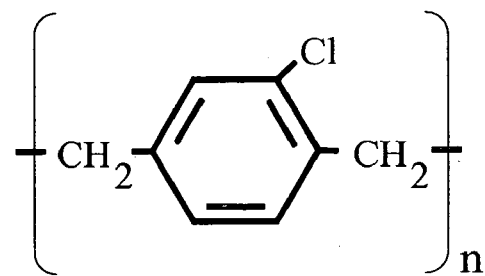
Figure 2: *Parylene C chemical structure*
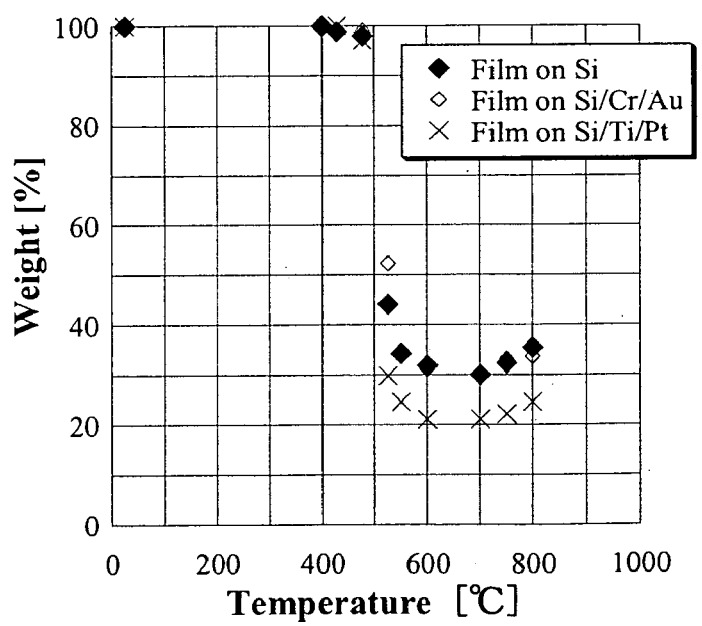
Figure 3: *Weight change according pyrolysis temperature ($N_2$, 10°C/min ramp rate)*

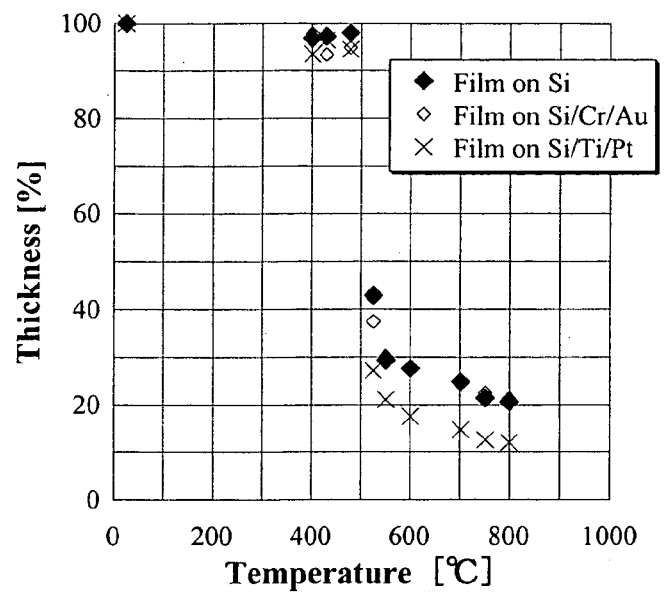
Figure 4: *Thickness change according to pyrolysis temperature ($N_2$, 10°C/min ramp rate)*
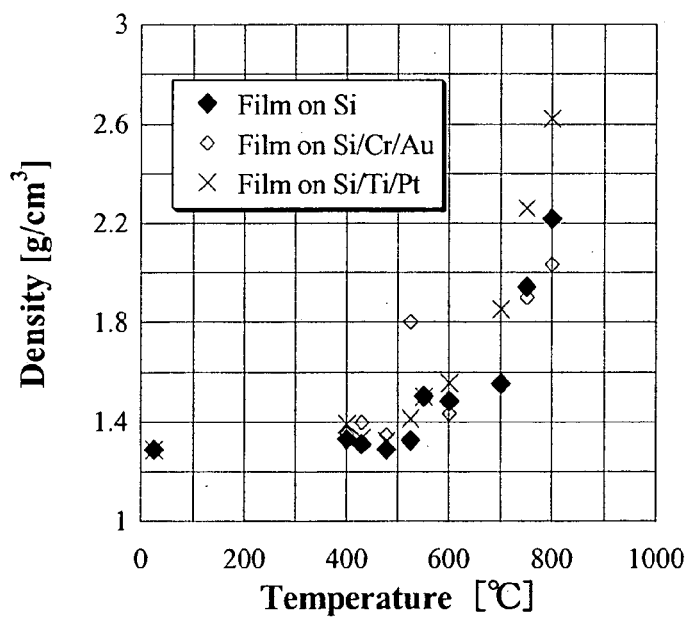
Figure 5: *Density vs. Pyrolysis temperature ($N_2$, 10°C/min ramp rate).*

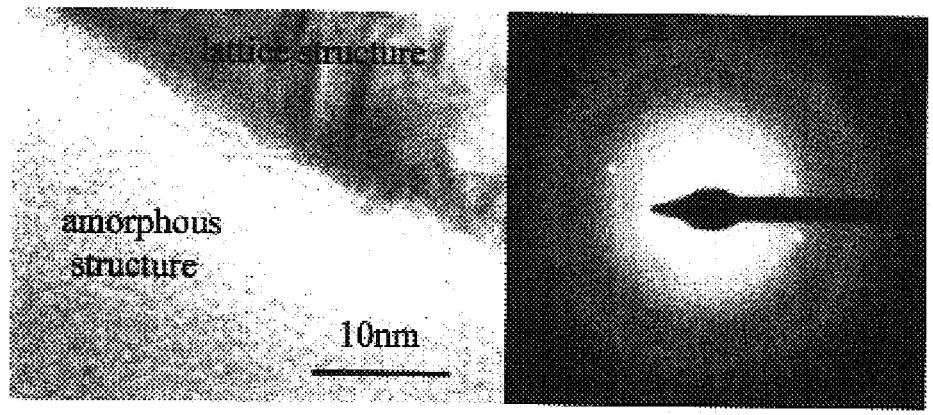
Figure 6: *TEM image (left) and electron-diffraction diagram (right) of a carbon film pyrolyzed at 800°C.*
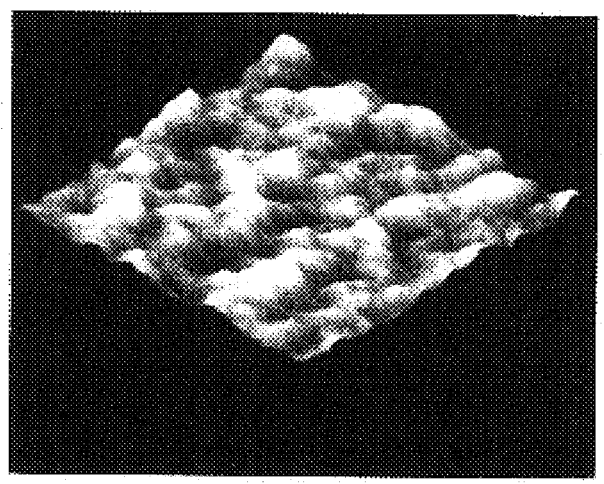
Figure 7: *AFM image of parylene-pyrolyzed carbon film surface pyrolyzed at 800°C.*

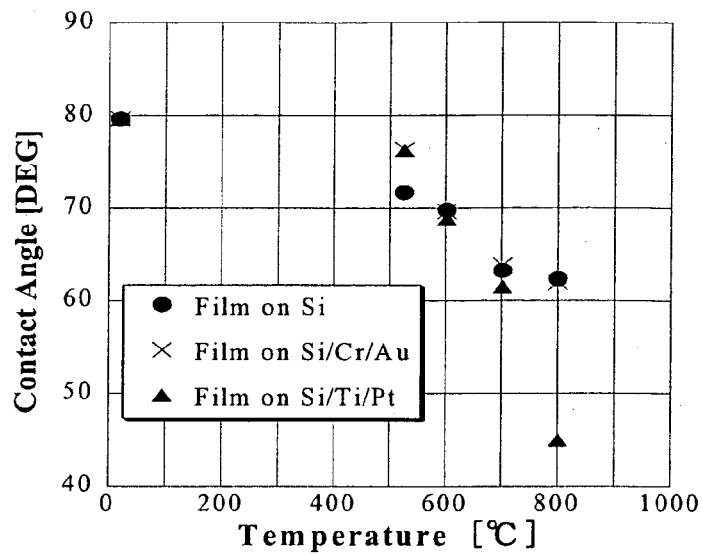
Figure 8: Contact angle according to pyrolysis temperature.
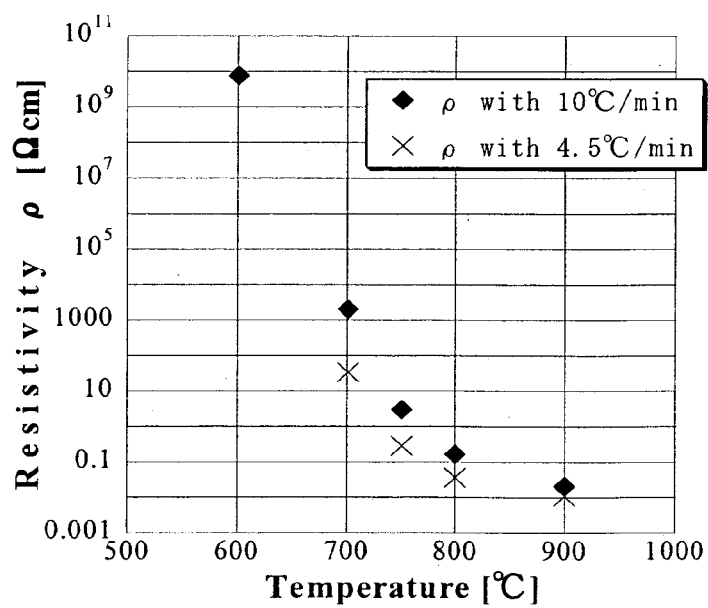
Figure 9: Resistivity of films vs. pyrolysis temperature.

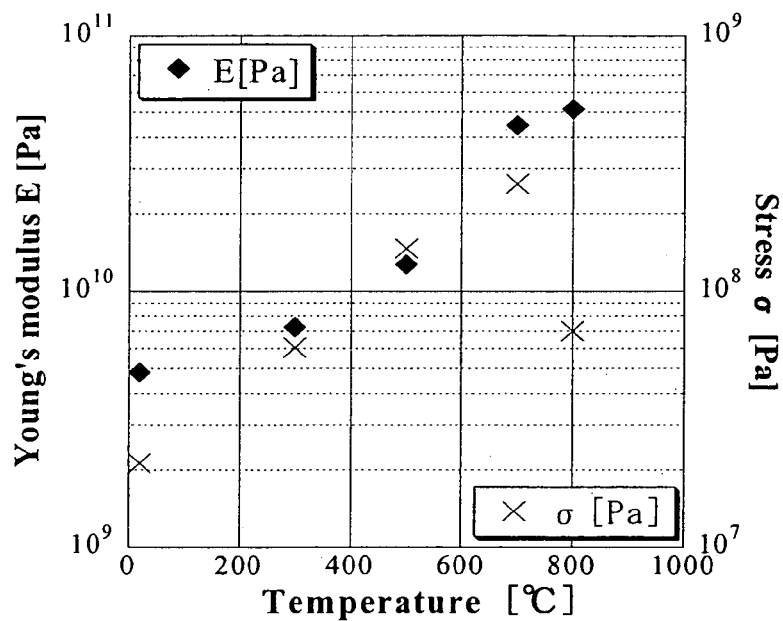
Figure 10: *Young's modulus and stress vs. pyrolysis temperature ($N_2$, 4.5□/min ramp rate).*
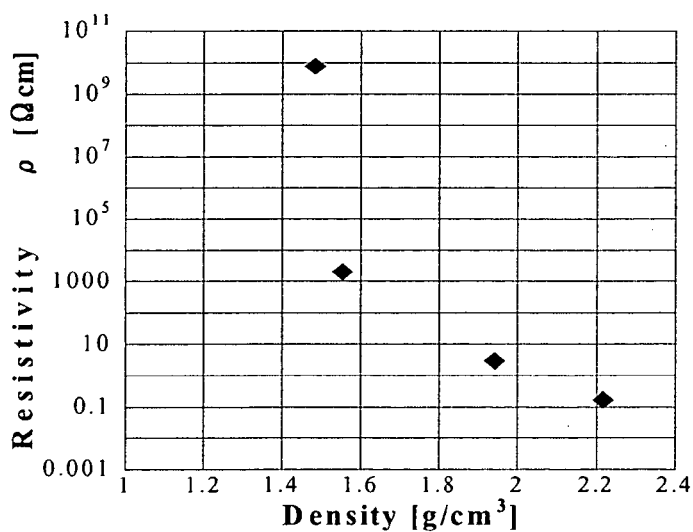
Figure 11: *Resistivity vs. density.*

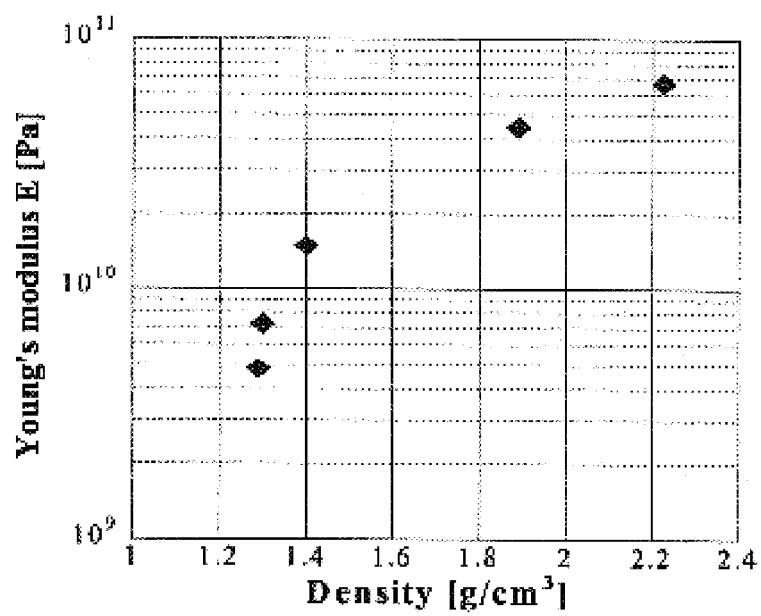
Figure 12: *Young's modulus vs. density.*
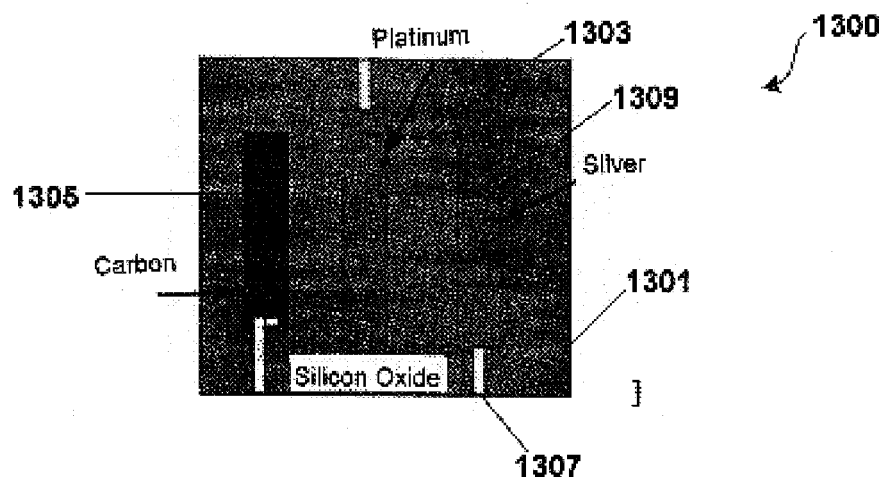
Figure 13: *Diagram of possible electrode layout*

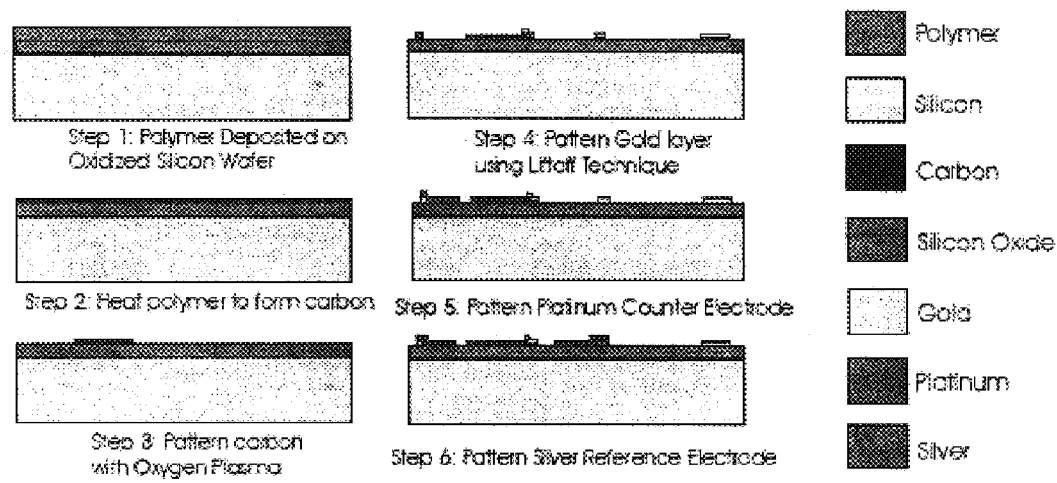
Figure 14: *Example of possible fabrication process*
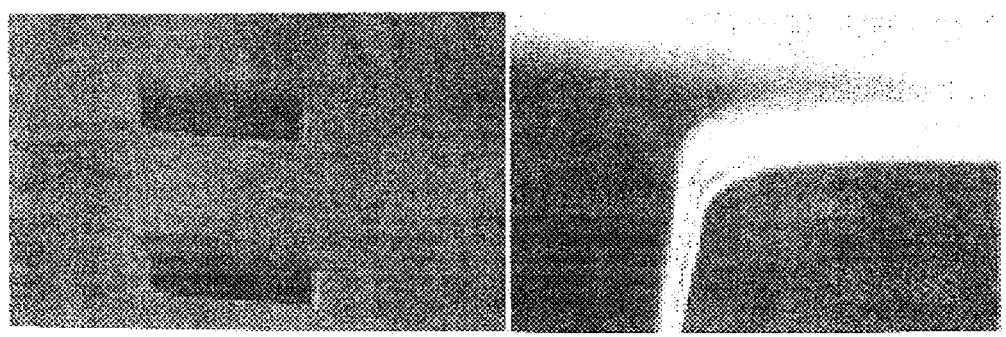
Figure 15: *(left) 25 um square wells coated in pyrolyzed parylene. (right) Cross-section of the edge of a well*

Suspension leg with thermal conductance G

Incoming Radiation P(W)

Resistive temperature sensor R, with TCR α and absorptivity η

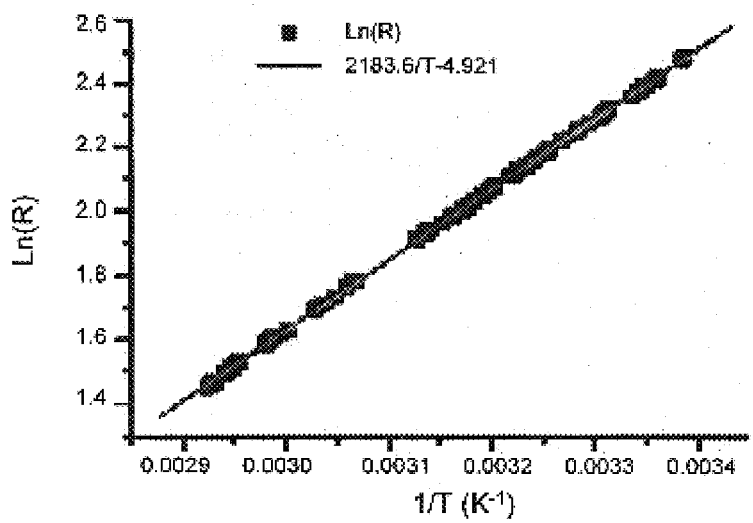
Figure 20: Resistance temperature dependence for pyrolyzed parylene
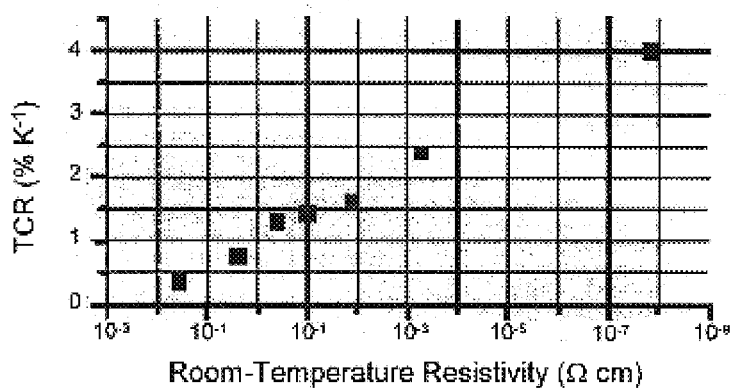
Figure 21: TCR vs. resistivity for various pyrolyzed-parylene films

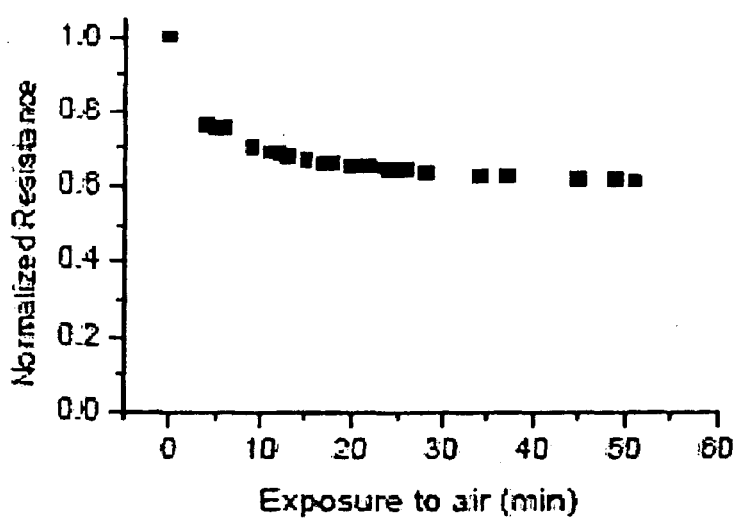
Figure 22: *Resistance drop when exposed to air after vacuum*

FIGURE 23
5000Å SiO$_2$ growth and patterning; 1$^{st}$ parylene deposition (3μm)
1$^{st}$ Parylene pyrolysis at 800°C (shrinks to 0.6μm); patterning
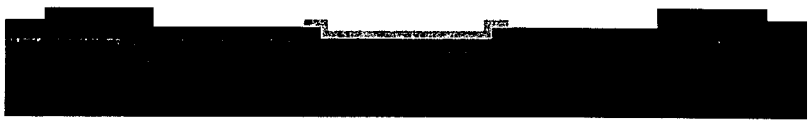
2d Parylene deposition (0.8μm), pyrolysis at 660°C; patterning
Ti/Au Evaporation (60Å/2000Å) and patterning; XeF$_2$ release
■ Si substrate    Parylene as-deposited    ■ Parylene pyrolyzed at 800°C
▓ Parylene pyrolyzed at 650°C    ■ Ti/Au

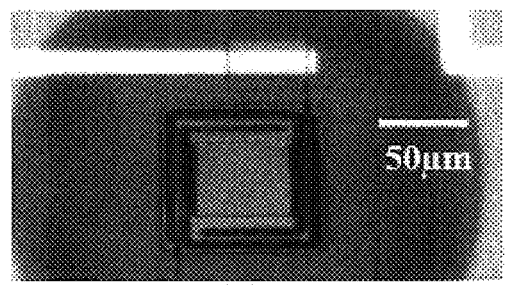
Figure 24: *Fabricated bolometer*
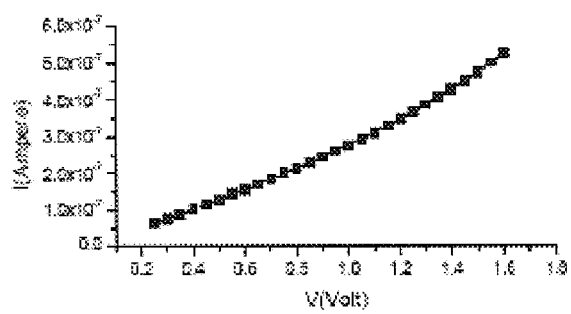
Figure 25: *Bolometer IV characteristic*
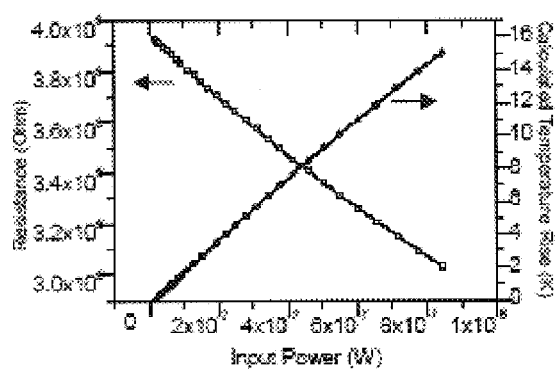
Figure 26: *Pixel Resistance and temperature rise as a function of input power*

PYROLYZED-PARYLENE BASED SENSORS AND METHOD OF MANUFACTURE

CROSS-REFERENCES TO RELATED APPLICATIONS

This application claims priority to U.S. Provisional Application Nos. 60/538,594, filed on Jan. 23, 2004, Caltech Ref. No.: CIT-4032-P, and 60/514,627, filed on Oct. 27, 2003, all of which are hereby incorporated by reference herein in their entirety for all purposes.

STATEMENT AS TO RIGHTS TO INVENTIONS MADE UNDER FEDERALLY SPONSORED RESEARCH OR DEVELOPMENT

Notice is hereby provided that certain aspects of the invention have been funded, in part, by Center for Neuromorphic Systems Engineering (CNSE) NSF Contract #EEC-9402726 and Cell Mimetic Space Exploration (CMISE) NASA Grant NCC2-1364-4.

BACKGROUND OF THE INVENTION

The present invention is directed to sensing devices and their processing. More particularly, the invention provides a method and apparatus for sensing electromagnetic radiation in the infrared spectrum using a bolometer device. The invention also provides a method and apparatus for sensing chemical species. But it would be recognized that the invention has a much broader range of applicability. For example, the invention can be applied to other wavelengths such as millimeter waves or visible light, biological materials, and other species and/or particles, and the like.

As technology progresses, certain types of detection devices have become important. Detection devices range from motion sensors to those that detect certain frequencies of electromagnetic radiation and detectors for a variety of chemical species. Motion sensors include, among others, mechanical, capacitive, inductive, and optical designs. A specific type of motion sensor includes accelerometers and the like, which rely upon micro-electrical mechanical systems ("MEMS") based technology. Such detection devices also include, among others, infrared detectors, and imagers. An example of infrared detectors include bolometer designs. Other types of detectors include chemical sensors, which rely upon sensing differences in voltage potentials while being coupled to an unknown chemical species.

Although many of these sensor designs have had certain success, a variety of drawbacks or limitations still exist. For example, conventional bolometer designs are often difficult to manufacture cost efficiently due to constraints in materials and processing techniques. Additionally, many if not all of these sensor designs use conventional mechanical, capacitive, inductive, and optical techniques that rely upon a variety of conventional metals and/or semiconductor materials. Such materials are often limited in the ability to provide an efficient and highly accurate device. Such materials are often reactive and may degrade over expended periods of time. These and other limitations of conventional devices can be found throughout the present specification and more particularly below.

From the above, it is seen that an improved technique for manufacturing devices is highly desired.

BRIEF SUMMARY OF THE INVENTION

According to the present invention, techniques directed to sensing devices and their processing are provided. More particularly, the invention provides a method and apparatus for sensing electromagnetic radiation in the infrared spectrum using a bolometer device. The invention also provides a method and apparatus for sensing chemical species. But it would be recognized that the invention has a much broader range of applicability. For example, the invention can be applied to other wavelengths such as millimeter waves or visible light, biological materials, and other species and/or particles.

In a specific embodiment, the present invention provides an apparatus for sensing electromagnetic radiation (e.g., bolometer) using carbon based sensing materials, e.g., pyrolyzed parylene, amorphous carbon based material. The apparatus has a substrate (e.g., silicon, silicon on insulator, other semiconductor materials, glass, quartz, metal and organic) comprising a surface region and an array of substantially carbon based material regions having a resistivity ranging within a predetermined range disposed overlying the surface. In a specific embodiment, the predetermined range is from about $10^8$ Ohms cm to about $10^{-3}$ Ohms cm. Each of the carbon based material regions comprises a portion being suspended over a region of the surface to thermally insulate the portion of the suspended carbon based material. In a specific embodiment, the insulating region also electrically insulates the portion of the suspended carbon based material. An insulating region is formed between the region and the portion of the carbon based material. Preferably, the insulating region is an air gap or other like structure according to a specific embodiment. The insulating region can also include multiple regions and/or layers, depending upon the embodiment. Each of the carbon based material regions is a pixel element for a plurality of pixel regions according to a specific embodiment. The apparatus has an interconnection coupled to each of the carbon based material regions. Preferably, the interconnection is made of a pyrolyzed carbon based material and/or metal based material, e.g., aluminum, copper, gold, silver, titanium, platinum, tungsten, and alloys, and/or any combination of these materials, and the like. One or more nodes couples to the interconnection. Preferably, the one or more nodes is able to independently read a resistivity value associated with (e.g., directly connected, coupled) at least one or more of the carbon based material regions. Preferably, each of the carbon based regions (or pixel elements) may change in resistivity value upon receiving a dosage of electromagnetic radiation, e.g., 8-14 micron wavelength band, 3-5 micron band. The carbon based region changes in temperature upon irradiation, which causes a resulting change in resistivity, which can be read out via interconnections and/or related reading devices.

In an alternative specific embodiment, the present invention provides a method for fabricating a sensing device, e.g., radiation. The method includes providing a substrate comprising a surface region. The method includes forming an insulating material overlying the surface region and forming a film of carbon based material overlying the insulating material. The method includes treating to the film of carbon based material to pyrolyzed the carbon based material to cause formation of a film of substantially carbon based material having a resistivity ranging within a predetermined range. In a specific embodiment, the predetermined range is from about $10^8$ Ohms cm to about $10^{-3}$ Ohms cm. Preferably, the method also forms a gap underlying a portion of pyrolyzed carbon based material.

In yet an alternative specific embodiment, the present invention provides an apparatus for chemical sensing using carbon based sensing materials. The apparatus has a pyrolyzed parylene carbon based electrode structure having a resistivity ranging within a predetermined range. Preferably, the electrode has a first end coupled to a second end and a length defined between the first end and the second end. An interconnect is coupled to at least one of the ends.

Still further, the invention provides a method for fabricating a sensing device. The method includes providing a substrate comprising a surface region and forming an insulating material overlying the surface region. The method also includes forming a film of carbon based material overlying the insulating material and treating to the film of carbon based material to pyrolyzed the carbon based material to cause formation of a film of substantially carbon based material having a resistivity ranging within a predetermined range. In a specific embodiment, the predetermined range is from about $10^8$ Ohms cm to about $10^{-3}$ Ohms cm. The method also provides at least a portion of the pyrolyzed carbon based material in a sensor application and uses the portion of the pyrolyzed carbon based material in the sensing application. In a specific embodiment, the sensing application is selected from chemical, humidity, mechanical strain, radiation or thermal.

Many benefits are achieved by way of the present invention over conventional techniques. For example, the present technique provides an easy to use process that relies upon conventional technology. In some embodiments, the method provides higher device yields. Additionally, the method provides a process that is compatible with conventional process technology without substantial modifications to conventional equipment and processes. Preferably, the invention provides for a method and device that can provide for room temperature detection of certain infrared frequencies according to a specific embodiment. Additionally, the present invention provides a sensing material that is generally easy to use, inert, light weight, and has good detection characteristics, e.g., signal to noise ratio. Using Parylene, which has been pyrolyzed, rather than conventional materials allows for improvements in performance due to its mechanical and thermal properties. As for the chemical sensor, there does not presently exist any other method for constructing a continuous electrode over insulating high aspect ratio micromachined structures according to an embodiment of the present invention. This property of pyrolyzed parylene makes three dimensional micromachined electrodes possible. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 2 is a simplified diagram of parylene C chemical structure according to an embodiment of the present invention;

FIG. 3-12 are simplified diagrams illustrating characteristics of parylene according to embodiments of the present invention;

FIG. 13 is a simplified diagram of a chemical sensing device according to an embodiment of the present invention;

FIG. 14 is a simplified diagram illustrating a fabrication sequence for a chemical sensing device according to an embodiment of the present invention;

FIGS. 15 through 18 are simplified diagrams illustrate experimental results of a chemical sensing device according to an embodiment of the present invention;

FIGS. 20-22 are simplified diagrams illustrating experimental results of a bolometer device according to an embodiment of the present invention;

FIG. 23 is a simplified diagram illustrating a fabrication sequence for a bolometer device according to an embodiment of the present invention;

FIG. 24 is a simplified top-view illustration of a bolometer device according to an embodiment of the present invention; and FIGS. 25-26 are simplified diagrams illustrating bolometer characteristics according to embodiments of the present invention

DETAILED DESCRIPTION OF THE INVENTION

According to the present invention, techniques directed to sensing devices and their processing are provided. More particularly, the invention provides a method and apparatus for sensing electromagnetic radiation in the infrared spectrum using a bolometer device. The invention also provides a method and apparatus for sensing chemical species. But it would be recognized that the invention has a much broader range of applicability. For example, the invention can be applied to other wavelengths such as millimeter waves or visible light, biological materials, and other species and/or particles.

Figure 1:
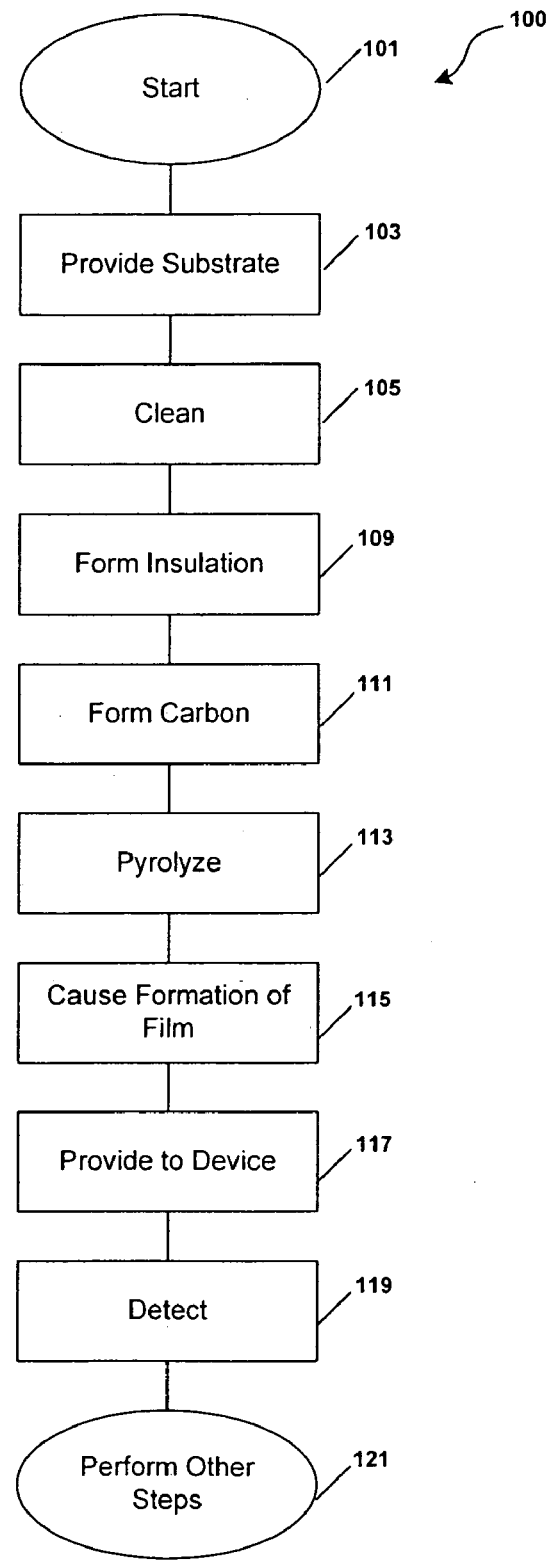
FIG. 1 is a simplified process flow diagram illustrating a fabrication sequence for a sensing device according to an embodiment of the present invention.

A method according to an embodiment of the present invention for fabricating a sensing device is briefly outlined below, which can also be referenced in the simplified flow diagram 100 of FIG. 1.

1. Start process (step 101);
2. Provide a substrate (e.g., silicon, glass, organic, metal) (step 103) comprising a surface region;
3. Clean (step 105) the surface region;
4. Form (step 107) an insulating material (e.g., silicon nitride, silicon oxide) overlying the surface region;
5. Form (step 109) a film of carbon based material (e.g., Parylene) overlying the insulating material;
6. Treat (step 111) the film of carbon based material to pyrolyzed the carbon based material;
7. Cause (step 113) formation of a film of substantially carbon based material having a resistivity ranging within a predetermined range based upon at least the treatment;
8. Provide (step 115) at least a portion of the pyrolyzed carbon based material in a sensing application;
9. Use (step 117) the portion of the pyrolyzed carbon based material in the sensing application;
10. Detect (step 119) a change in characteristic (e.g., resistance) of the pyrolyzed carbon based material from an application of electromagnetic radiation and/or chemical and/or biological species and/or other entities; and
11. Perform (step 121) other steps, as desired.

The above sequence of steps provides a method according to an embodiment of the present invention. As shown, the method uses a combination of steps including a way of forming a sensing device using a pyrolyzed parylene bearing material or the like. Other alternatives can also be provided where steps are added, one or more steps are removed, or one or more steps are provided in a different sequence without departing from the scope of the claims herein. Further details of the present method and structure can be found throughout the present specification and more particularly below. Before discussing specific sensor type applications, we have provided a brief description of a carbon based material and in particular parylene-pyrolyzed carbon according to an embodiment of the present invention as applied generally to MEMS applications.

In a specific embodiment, the present invention provides methods and structures using carbon bearing materials including Parylene-pyrolyzed carbon for MEMS applications. More particularly, such MEMS applications includes sensing devices and the like. Carbons have been used as conductive materials with many promising chemical and thermal properties. The present invention preferably uses parylene-pyrolyzed carbon to take advantages of its smooth surface deposition and benzene-rich chemical structure. The description of the parylene-pyrolyzed carbon was tried through evaluations of electrical and mechanical properties in terms of MEMS applications as well as general features. Young's modulus and the resistivity of parylene-pyrolyzed carbon (800° C. pyrolysis) becomes 70 GPa and 0.1 Ωcm, respectively. The relationship between these properties and density will be also discussed.

We focus on Parylene as the precursor of the pyrolyzed carbon according to a specific embodiment. Parylene, especially Parylene C, has been used in MEMS to take advantages of its useful combination of electrical and mechanical properties and low permeability. See, X-Q Wang, Q. Lin, and Y-C Tai, "A Parylene Micro Check Valve", in *Digest-Tech. Papers MEMS'99 Conference*, 1999, pp. 177-182. Moreover, smooth coating of Parylene film on the surface with topographical variations, such as grooves, cavities, and trenches, can be expected due to CVD deposition at room temperature in vapor phase.

The pyrolysis or carbonization makes it possible to change properties of the precursor material according to a specific embodiment. Regarding electrical property, dielectric polymers change into conductive carbons through pyrolysis. Therefore, pyrolysis of Parylene provide a novel material for MEMS with taking over several advantages of Parylene based MEMS. Benzene-rich chemical structure of Parylene is also attractive for carbonization. According, further details of the present method and system using Parylene-pyrolyzed carbon have been provided throughout the present specification and more particularly below.

Pyrolysis of Parylene thin film involves deposition of parylene film on substrates and pyrolysis by heating in the absence of $O_2$ according to a specific embodiment. Parylene C film is employed as a precursor of carbon among members of Parylene Chemical structure of Parylene C is shown in FIG. 2. Parylene C is modified poly-paraxylylene by the substitution of chlorine atom for one of the aromatic hydrogens according to a specific embodiment.

At first according to a specific embodiment, thermal gravimetric analysis ("TGA," $N_2$ atmosphere, 10° C./min ramp rate from 20 to 1200° C.) was executed in order to estimate the pyrolysis process of Parylene C. 4 µm-thick Parylene C films were prepared on various substrates according to a specific embodiment. The thermal gravimetric analysis suggested that there were three phases (for purposes of this discussion) of the pyrolysis process of Parylene C from 20 to 1200° C. In the first phase, up to 500° C., slight weight change was observed. It seems to be due to the loss of moisture and some volatiles. The drastic weight loss could be observed between 500 and 600° C. (the second phase). The main degradation seems to occur in this phase. In the third phase, gradual weight loss continued at elevated temperature. In this experiment, a silicon ("Si") substrate and a Si substrate with 400 nm thick Ti/Pt film were prepared as substrates for the pyrolysis of Parylene C in order to estimate a catalytic effect of platinum ("Pt"). The result was that the larger weight loss at lower temperature occurred in the pyrolysis of Parylene C on Ti/Pt layer.

Based on the results of preceded TGA, further investigation of changes in weight, thickness, and density through the pyrolysis was accomplished as reported in the following sub-sections. 4 µm-thick Parylene C films were deposited on various substrates and pyrolyzed at different temperatures in $N_2$ atmosphere up to 800° C. with 10° C./min ramp rate in these experiments. In addition to Si and Si/Ti/Pt, Si substrate with 200 nm thick Cr/Au film (Si/Cr/Au) was prepared to estimate catalytic effects.

Weight of Parylene C film was measured before and after the pyrolysis (see FIG. 3). In FIG. 3, weight [%] as Y-axis means a ratio of weight of pyrolyzed film against initial weight of Parylene C film. The results show good agreements with the preceded TGA except the weight increase at higher temperature. It was found that after exposure to air (20° C., 47% in humidity), the weight of carbon film decreased by baking at 100° C. or in vacuum. The weight then increased once exposed to air again. We believe the weight change is due to moisture absorption and desorption.

We also focused on changes in thickness because no obvious changes in lateral directions of Parylene C film could be observed in our preliminary experiments. FIG. 4 shows measured results of thickness changes of Parylene C film according to pyrolysis temperature. Thickness [%] as Y-axis means a ratio of thickness of pyrolyzed film against initial thickness of Parylene C film. Thickness of films was measured by a surface profiler. Three phases can be recognized as suggested by preceded TGA. Shrinkage of film still continued in the third phase differently from results of weight change. Furthermore, the shrinkage ratio of the film on Si/Ti/Pt dipped from 15% for 800° C. pyrolysis, while those of the film on Si and Si/Cr/Au were about 20% for 800° C. pyrolysis.

The properties of carbons are strongly connected with the density. See, W. F. Knippenberg and B. Lersmacher, "Carbon foam", *Phillips tech. Rev.*, vol. 36(4), pp. 93-103, 1976. From this point of view, changes in density are evaluated in FIG. 5 based on the results of changes in weight and thickness. There seems to be discontinuity around 500° C. corresponding to the beginning of the second phase of weight change. The high values of the density at higher temperature in FIG. 5 can be explained by the moisture phenomena as mentioned above. Scattering values between 500 and 600° C. show a transient phase of this pyrolysis. The results in FIG. 5 will be used to investigate relations between density and various properties in the following sections.

In order to evaluate our findings, carbon film pyrolyzed from Parylene C at 800° C. was observed by TEM (see FIG. 6). We can see small amounts of graphite-like crystallite structures. The electron-diffraction diagram also confirms the existence of (002) plane of graphite. However, as a whole, this film is recognized as amorphous carbon.

Film surfaces pyrolyzed at various temperatures were observed by the AFM. The AFM image of a film pyrolyzed at 800° C. is shown in FIG. 7. The AFM observation tell us that surface roughness are within 5 nm for both films pyrolyzed at 500° C. and 800° C. However, a periodical length of roughness for the film at 800° C. was longer than that for 500° C. FIG. 8 shows measured contact angels according to pyrolysis temperature. The contact angle fell around 500° C. as well as changes in weight and thickness.

Certain electrical properties were also observed. The resistivity of Parylene-pyrolyzed carbon depending on pyrolysis temperature is evaluat Parylene C films were pyrolyzed at different temperatures in $N_2$ atmosphere up to 900. The resistivity was calculated from measured sheet resistance and film thickness. The ramp rate of elevated temperature were set at two values (10° C./min and 4.5° C./min) and compared in this experiment.

Parylene C films pyrolyzed at a low pyrolysis temperature exhibited high resistivity. The resistivity became less than $1\times10^{10}$ Ωcm above 600° C. and decreased to about $1\times10^{-2}$ Ωcm at 900° C., which was close to $5\times10^{-3}$ Ωcm reported for glassy carbons obtained above 1000° C. See, S. Ranganathan, R. McCreery, S. M. Majji, and M. Madou, "Photoresist-derived for microelectromechanical Systems and Electrochemical applications", *Journal of The Electrochemical Society*, 147(1), pp. 277-282, 2000. The pyrolysis with a lower ramp rate could provide a lower resistivity.

Next, the Young's modulus and the stress of Parylene-pyrolyzed carbon were evaluated by the diaphragm load-deflection tests. The deformation of the carbon diaphragm pyrolyzed from 3 μm-thick Parylene C on Si frame structure was measured according to supplied pressure. See, O. Tabata, K. Kawahata, S. Sugiyama, and I. Igarashi, "Mechanical property measurements of thin-films using load deflection of composite rectangular membranes", *Sensors and Actuators*, vol. 20, pp. 135-141, 1989. Both Young's modulus and the stress are simultaneously obtained by fitting the resulting data to the load-deflection relationship reported by O. Tabata, K. Kawahata, S. Sugiyama, and I. Igarashi, "Mechanical property measurements of thin-films using load deflection of composite rectangular membranes", *Sensors and Actuators*, vol. 20, pp. 135-141, 1989. 3 μm-thick Parylene C membranes on Si frame structures as specimens were prepared as follows. 3 μm-thick Parylene C film was deposited on a 20 μm-thick Si diaphragm structure and released to form Parylene C membrane by $BrF_3$ etching of remaining 20 μm-thick Si layer.

FIG. 10 shows calculated Young's modulus and the stress according to pyrolysis temperature. In the calculation, a Poisson's ratio was assumed to be 0.4. The Young's modulus after the pyrolysis became ~50 GPa for 800° C. pyrolysis (4.5° C./min ramp rate). The stress also increased below 700° C. but showed a drop at 800° C.

We could see considerable evidences to prove catalytic effects of Pt for pyrolysis of Parylene C in most of presented results. These results are presumable because Pt shows catalytic effects in many other chemical reactions while further investigation into our case is necessary.

Next, relations between properties and density of parylene-pyrolyzed carbon are discussed. Here, density is calculated by using weight of film in air, that is to say, weight with moisture. The relationship between the Young's modulus and the density is shown in FIG. 12. FIG. 12 tells that a larger density corresponds to a larger Young's modulus. Moreover, the relationship between the resistivity and the density is also depicted in FIG. 11 that a higher density corresponds to a lower resistivity.

As noted above, Parylene-pyrolyzed carbon for MEMS applications has been provided. Young's modulus and resistivity of parylene-pyrolyzed carbon (800° C. pyrolysis) showed 70 GPa and 0.1 Ωcm, respectively. The relations between these properties and density were also discussed.

Further details of the use of Parylene-pyrolyzed carbon for sensing devices according to embodiments of the present invention can be found throughout the present specification and more particularly below.

Electrochemical Sensor

Electrochemical sensors are used in a wide variety of applications including pH monitoring, gas monitoring, and ion detection. Electrochemical sensors are also used as a basic laboratory instrument to study the chemical behavior and kinetics of many reactive species. Electrochemical sensors experience enhanced performance when they have micron and submicron feature sizes and are composed of highly inert materials. This sensor combines both micron feature sizes with a novel inert thin-film carbon that is compatible with standard surface micromachining processes. The ability to deposit a thin-film carbon and pattern it using photolithography improves device performance and simplifies device manufacturing compared to screen printed carbon which is the only other available method for on-chip carbon electrodes. (please, delete this part . . . it is not accurate)

FIG. 13 shows the concept of the thin-film carbon electrochemical sensor 1300 according to a specific embodiment. This diagram is merely an example, which should not unduly limit the scope of the claims herein. One of ordinary skill in the art would recognize other variations, modifications, and alternatives. As shown, various electrode elements 1305, 1303, 1309 are disposed on an insulating material 1301. The insulating material can be silicon dioxide or other film or films of insulating characteristics. The electrodes include reference electrode 1303 and electrode 1309, which can be made respectively of platinum and silver. Each of these electrodes includes conductive wiring 1307, which is coupled to a measuring device. Preferably, the sensor also includes carbon based electrode 1305 formed on the insulating material. Of course, there can be other variations, modifications, and alternatives.

In a specific embodiment, the carbon layer is constructed by first depositing a carbon containing polymer. Such polymers include but are not limited to all varieties of photoresist, Parylene N, Parylene C, and Parylene D. Photoresist is spun on while all three types of Parylene are deposited by vapor deposition. The polymer is then heated to temperatures in excess of 450° C. in an inert atmosphere to force the polymer to undergo pyrolysis according to a specific embodiment. By varying the pyrolysis temperature several material properties can be controlled such as the carbon's porosity, resistivity, density, thickness, thermal conductivity, grain structure, and other parameters. The resulting layer of carbon can then be patterned using standard photolithographic and plasma etching techniques. Variations on this process include the addition of a metal catalyzer (e.g., nickel, gold, platinum, titanium) above or below the polymer and modification of the carbon's surface with ion selective membranes or other specialized polymers, e.g., Nafion. Additional metallization layers can be added to the carbon to construct counter and reference electrodes as well as on-chip wiring and bonding pads. These metallization layers are patterned through standard metal lift-off techniques. Such metallization layers include aluminum, gold, platinum, copper, silver, and others. As noted, the chip can than be wired to an external potentiostat to conduct a wide variety of electrochemical studies. Of course, there can be other variations, modifications, and alternatives. Details of a way of processing the carbon based electrode can be found throughout the present specification and more particularly below.

FIG. 14 is a simplified diagram illustrating a fabrication sequence for a chemical sensing device according to an embodiment of the present invention. This diagram is merely an example, which should not unduly limit the scope of the claims herein. One of ordinary skill in the art would recognize many variations, modifications, and alternatives. As shown, the process starts (step 1) with the oxidation of a silicon wafer or the use of a high-temperature quartz wafer or other suitable materials. Alternatively, other types of substrates (e.g., organic). Additionally, other types of insulating films can also be used. The carbon containing polymer is deposited either by spinning it on the wafer or by vapor deposition according to a specific embodiment. If a metal catalysis is being used it should be deposited and patterned by thermal evaporation, sputtering, or e-beam evaporation prior to the deposition of the polymer. An example of such metal catalyzer is nickel, but can be others.

Referring to step 2, the wafer with the polymer is then heated to the desired pyrolysis temperature in an inert (e.g., argon or nitrogen) atmosphere or vacuum. After pyrolysis the carbon layer is patterned (step 3) using $O_2$ plasma etching with a photoresist mask. The wafer is then prepared for metal liftoff by depositing and patterning a layer of photoresist. Alternatively, other types of etching techniques can be used depending upon the embodiment.

A gold metal layer is deposited (step 4) to form wires and bonding pads. Alternatively, other types of metals such as aluminum, platinum, and silver can also be used. Two additional metal layers of platinum and silver are deposited and patterned (steps 5 and 6) in the same manner to form the counter and reference electrodes, respectfully. These additional layers are optional depending on the application. An additional layer of Parylene is also optional. This additional layer serves as a chemical barrier to isolate on-chip wires and to better control the geometry of the exposed electrode surface. This layer can be patterned using an $O_2$ plasma etching with a photoresist mask. Of course, there can be other variations, modifications, and alternatives.

Existing carbon deposition techniques (screen printing) limit the feature size of on-chip electrochemical electrodes to greater than 90 um and to thicknesses in excess of 5 um with only 12 um resolution in geometric feature definition according to a specific embodiment. This present carbon deposition technology allows for reliable and repeatable fabrication of carbon electrodes with feature sizes as small as 2 um, thicknesses as small as 50 nm, and geometric resolution as small as 2 um according to alternative embodiments. This thin-film carbon has the additional benefit of having tunable mechanical and electrical properties. Depending upon the embodiment, one or more of these benefits may be achieved.

Although the above has been described in terms of specific embodiments, there are other variations, modifications, and alternatives. As merely an example, certain device geometry can be varied from application to application according to a specific embodiment. For example, such device geometry can be inter-digitated electrodes, micromachined posts, and changes in electrode length and width. Alternatively, metals used as counter and reference electrodes and for bonding pads and wiring can be varied (e.g., shorting reference and counter electrodes or using an electrode as a preconcentrator (electrochemical stripping) according to other embodiments. Different carbon polymers may be used as the carbon source according to a specific embodiment. Such carbon polymers can include, among others, photoresist and other types of parylene. A metal catalysis (e.g., nickel or gold) may be used to further tune the carbon layer's mechanical and electrical properties in other embodiments. A variety of ion selective membranes (e.g., Nafion) may be used to coat the carbon electrode to increase electrochemical sensitivity and selectivity for particular analytes in yet other embodiments. For example, such coatings can include Nafion or polypyrol. Mechanical structures can be added near the electrodes to aid in fluid containment and transport in further embodiments. For example, such structures can be micro-fluidic channels. A coating or other type of insulation (e.g., Parylene) may be added to isolate parts of the chip from the chemical solution in alternative embodiments. Depending upon the embodiment, there can be other variations, alternatives, and modifications.

EXAMPLE

To prove the principle and operation of the chemical sensor technique in present invention, we performed certain experiments. These experiments are merely examples and should not unduly limit the scope of the claims herein. One of ordinary skill in the art would recognize many variations, modifications, and alternatives. In these experiments, we fabricated thin-film carbon microelectrodes for integration into a variety of chemical and biochemical sensors. The carbon films were compatible with standard MEMS processing, most importantly photolithography, and still maintained many if not all the electrochemical benefits of carbon. Pyrolyzed parylene-C not only meets these desired requirements but it is also conformal over high aspect ratio structures. Conformal carbon coating could be used to make high effective surface area electrodes by coating high aspect ratio structures (See, FIG. 15).

Figure 16:
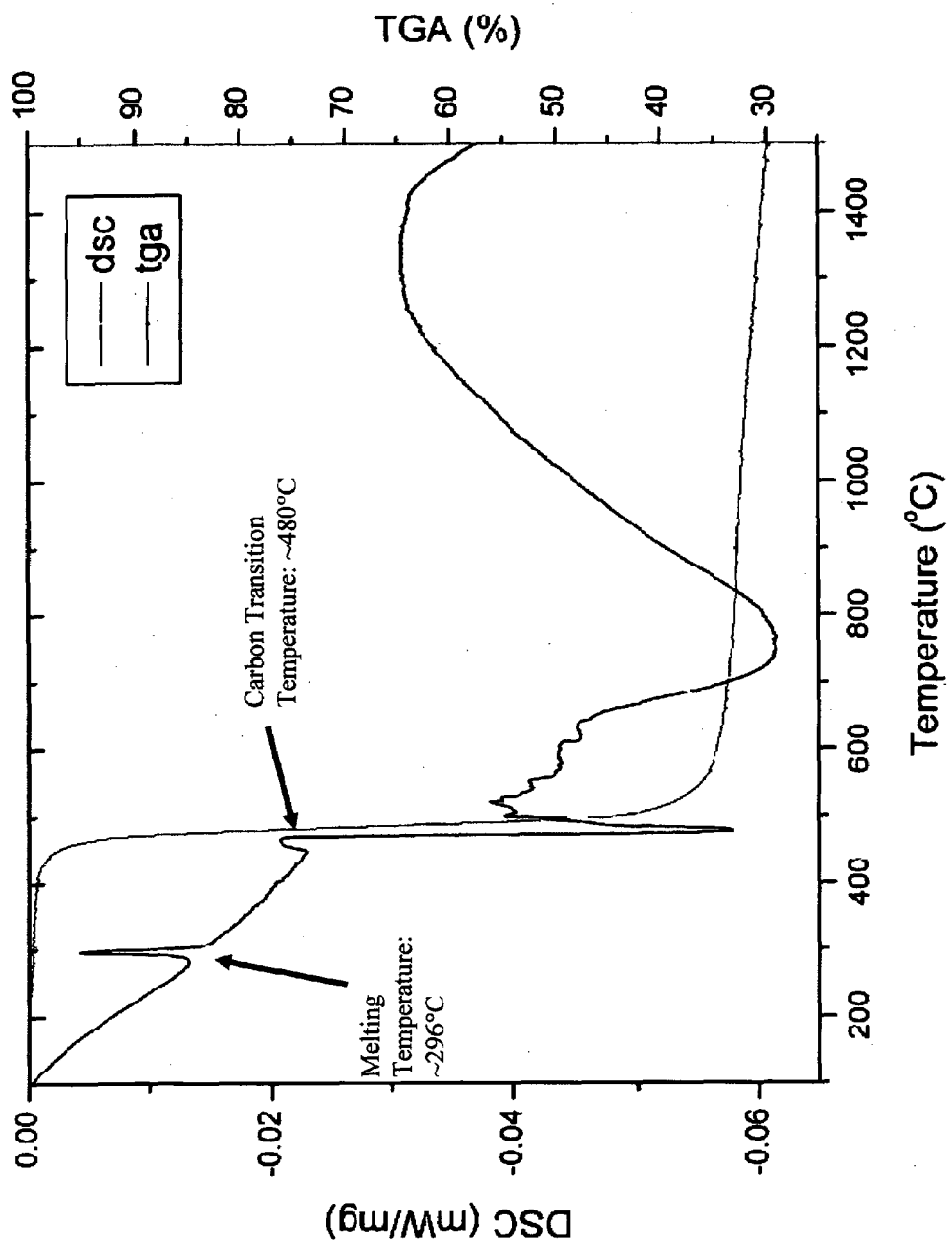

A free standing film of parylene-C (15.8 mg) was examined by simultaneous thermal analysis, which provides thermo gravimetric analysis and differential scanning calorimetry. The sample was heated to 1500 Degrees Celsius with a heating rate of 5 Degrees Celsius/min in flowing Ar (100 mL/min). As seen in FIG. 16, the material undergoes an endothermic phase transition, presumably melting, at 296 Degrees Celsius. An exothermic event peaks near 480 Degrees Celsius, and is accompanied by a weight loss of 66%. Total weight loss to 1500 Degrees Celsius is 70.1%.

Figure 17:
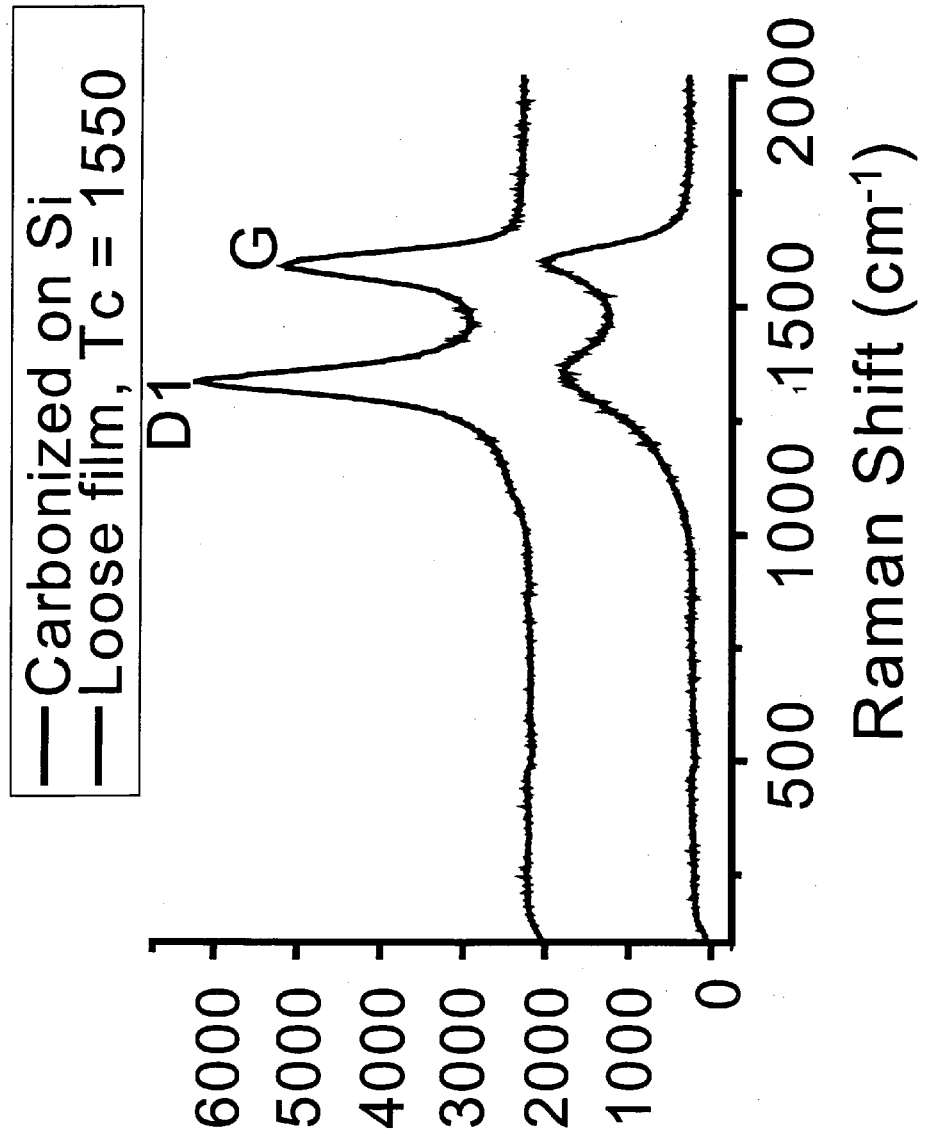

Micro Raman analysis was conducted on both loose film and attached parylene samples (FIG. 17). Parylene carbonized at 900 Degrees Celsius on Si shows broad and poorly defined G and D1 peaks, whereas carbonization at 1550 Degrees Celsius in flowing Ar resulted in narrow and well-defined peaks, clearly indicative of glassy carbon. The band near 1580 cm-1 is known as the graphite band (G band) and corresponds to the in-plane vibration of C atoms in graphite structure [See O. Beyssac, B. Goffe, et. al, "On the characterization of disordered and heterogeneous carbonaceous materials by Raman spectroscopy," *Spectrochimica Acta Part A,* 59 2267-76 (2003); also F. Tuinstra and J. L. Koenig, "Raman spectrum of graphite," *J. Chem. Phys.,* 53 [3] 1126-30 (1970)] For perfect single crystal graphite, it would be the only band observed. The presence of the so-called defect band (D1) around 1350 cm-1 indicates that a finite particle size is associated with carbonized parylene. The D1 band is broader for poorly ordered carbons, and narrows as increased heat treatment results in increased order.

Figure 18:
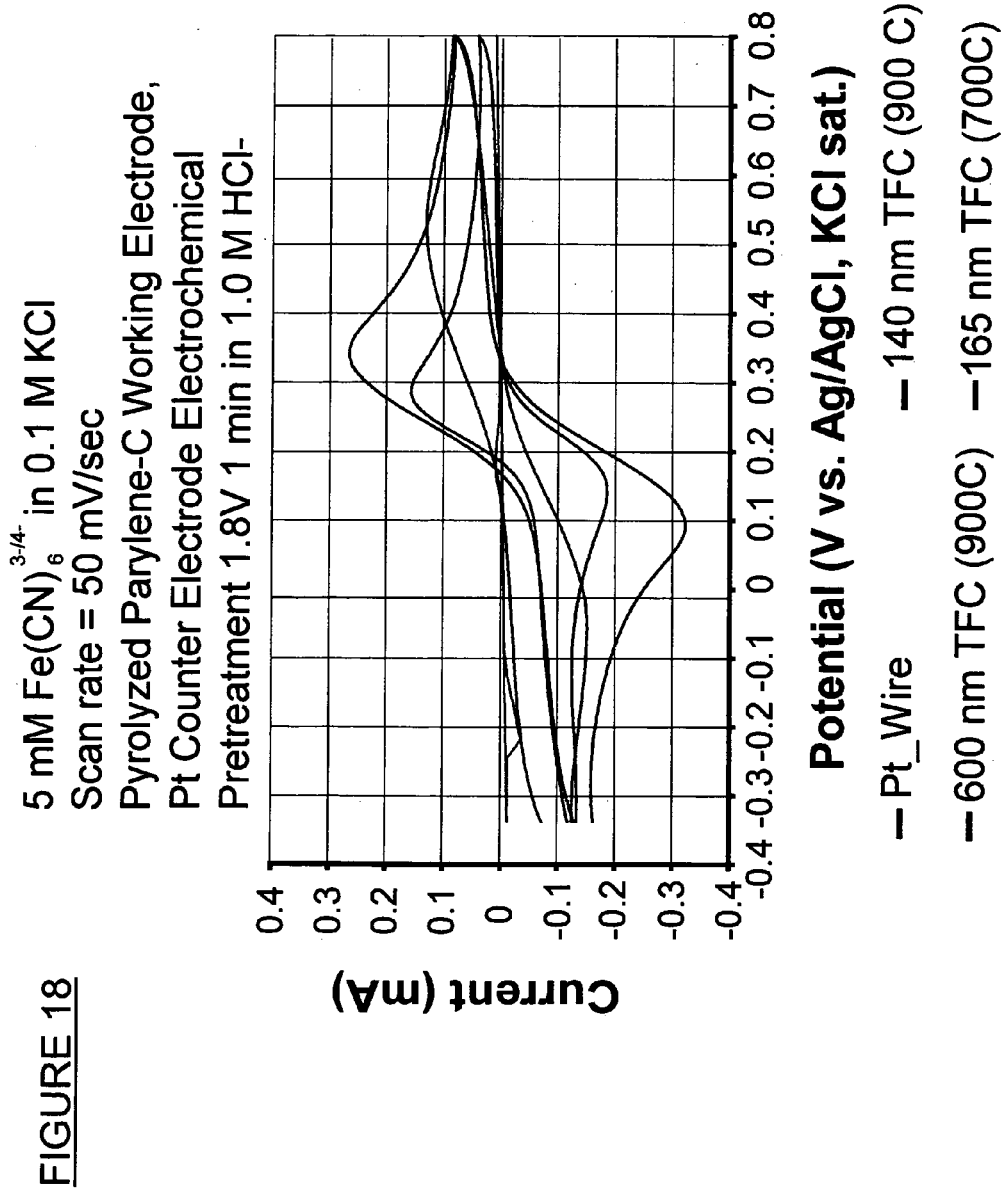

Thin-film pyrolyzed parylene-C electrodes were fabricated using room temperature polymer vapor deposition onto a Si/SiO$_2$ substrate. The electrodes were pyrolyzed in a nitrogen atmosphere then patterned using O$_2$ plasma. The 900 Degrees Celsius electrodes were then isolated with a second parylene layer and metal contacts were deposited. FIG. 18 shows cyclic voltammograms of 5 mM in 0.1 M KCl for various processing parameters of the pyrolyzed parylene as well as a scan using a Pt electrode for comparison. Improvements in electrode kinetics, evident by a reduction in peak-to-peak separation, can be observed as carbonization temperature and film thickness are increased.

Although the above has been described in terms of specific embodiments, there can be other variations, modifications, and alternatives. These and other variations will be further described throughout the present specification and more particularly below.

Bolometer Designs

In a specific embodiment, the present invention provides a method and apparatus for a bolometer design. More particularly, the invention provides a method and system for an uncooled, room-temperature, all parylene bolometer device. The device includes two layers of pyrolyzed (or "carbonized") parylene and a metal layer for interconnections according to a specific embodiment. Other embodiments may include a single layer of pyrolyzed parylene. We demonstrated that high responsivity can be achieved by tailoring the electrical conductivity and the temperature coefficient of resistance (TCR) using different pyrolysis conditions for each parylene layer. Further details of the present device and methods of manufacture can be found throughout the present specification and more particularly below.

Figure 19:
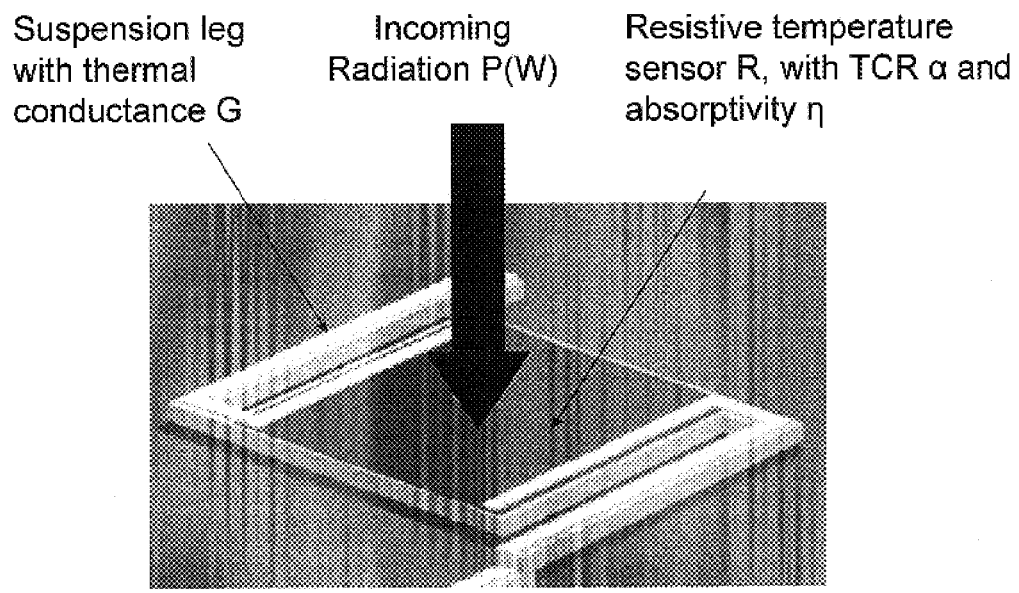
FIG. 19 is a simplified diagram of a bolometer device according to an embodiment of the present invention.

FIG. 19 is a simplified diagram of a bolometer sensing device 1900 according to an embodiment of the present invention. This diagram is merely an example, which should not unduly limit the scope of the claims herein. One of ordinary skill in the art would recognize many variations, modifications, and alternatives. As shown, the sensing device is a resistive uncooled bolometer. The device has a free-standing temperature-sensitive element that is linked to a substrate by low thermal conductance legs. As merely an example, Equation (1) shows the expression of the direct current responsivity (in Volts per incident Watt) for such a device.

$$R(V \cdot W^{-1}) = \frac{\Delta V}{P} = \frac{\alpha R I_{bias} \eta}{G}, \quad (1)$$

where $\alpha$ is the TCR of the sensing element. R is the bolometer resistance, G is the pixel-to-substrate thermal conductance and $\eta$ is the bolometer absorptance. The thermal time constant is given by:

$$\tau(s) = \frac{C}{G}, \quad (2)$$

where C is the thermal capacitance. Preferably, a desirable parameters to obtain good responsivity are: high pixel-TCR and low pixel to-substrate thermal conductance. However, as we try to decrease the thermal conductance, we must be able to decrease the thermal conductance. Most conventional uncooled bolometers use vanadium oxide [see P. E. Howard et al Proc. SPIE Vol. 3698 131 (1999)] or amorphous silicon [see Tissot J L, Infrared Physics & Technology 43 (3-5) 223-228 June-October 2002] as temperature-sensitive material, reaching a TCR of about 1.5% to 3%. Another possible material is YBaCuO [see A Semiconductor YBaCuO Microbolometer for Room Temperature IR Imaging," A. Jahanzeb, C. M. Travers, Z. Celik-Butler, D. P. Butler, and S. Tan, *IEEE Transactions on Electron Devices*, vol. 44, pp. 1795-1801, 1997]. The suspension legs are usually made of silicon nitride or polysilicon. In the case of silicon nitride legs, it is necessary to have another layer for electrical conduction. Here, we propose a bolometer using pyrolyzed parylene both for the temperature-sensing element and for the suspension legs according to a specific embodiment.

As background information, we will describe certain properties of pyrolyzed parylene. Pyrolyzed parylene as a MEMS "sacrificial" material was first reported by Hui et al in 1998 [see E. E. Hui, C. G. Keller, and R. T. Howe, "Carbonized parylene as a conformal sacrificial layer", 8*th Solid-State Sensor and Actuator Workshop Technical Digest Hilton Head,* 1998, pp. 256-260] in which carbonized parylene is subsequently burned away in O$_2$ environment at high temperature. Other than that, it is also known that pyrolysis of polymers can lead to electrically conductive or partial conductive films [see E. E. Hui, C. G. Keller, and R. T. Howe, "Carbonized parylene as a conformal sacrificial layer", 8*th Solid-State Sensor and Actuator Workshop Technical Digest Hilton Head,* 1998, pp. 256-260]. Interestingly, we showed that the electrical conductivity of pyrolyzed parylene can be adjusted over a very wide range (from insulating down to ≈10$^{-2}$ Ω·cm) depending on the pyrolysis conditions [see S. Konishi M. Liger, T. A. Harder and Y. C. Tai, to be published in *IEEE MEMS'04 Technical Digest*]. We studied the temperature dependence of the resistance of pyrolyzed parylene films. FIG. 21 shows the temperature dependence of the resistance of a sample having a resistivity of 1.9*10$^3$ Ω·cm at room temperature. As can be seen on this figure, the conductivity follows an Arrehnius dependence:

$$\sigma \propto \sigma_0 * e^{-E_\alpha/kT}, \quad (2)$$

where a $E_\alpha$ is the activation energy.

For a resistivity having an Arrehnius dependence, the temperature coefficient of resistance (TCR) is given by, $$\alpha = -\frac{E_a}{kT^2}, \quad (3)$$

Like other materials often used in uncooled infrared sensors (vanadium oxide and amorphous silicon), the TCR of pyrolyzed parylene increases with resistivity. FIG. 22 shows the TCR of various films having different resistivities (obtained by pyrolysis at different temperatures). The TCR of pyrolyzed-parylene does show a logarithmic dependence on the resistivity. The measured TCR was −4%/K for films having ~10$^8$ Ω·cm resistivity down to −0.3%/K for films having ~10$^{-2}$ Ω·cm resistivity. The corresponding activation energies are 0.023 eV and 0.3 1eV respectively. Because higher bolometer resistance leads to higher thermal noise, there is a trade-off between high responsivity (given by high TCR) and signal-to-noise ratio (given by low resistance).

While measuring the temperature dependence of the films in air, it was found that the resistivity of pyrolyzed parylene is sensitive to moisture. Therefore, the TCR measurements were performed in a vacuum chamber. FIG. 22 shows the resistance drop of a pyrolyzed-parylene film when exposed to air after being stabilized in vacuum. This resistance change is reversible. However, this sensitivity to moisture is not a problem for our application since uncooled bolometers operate in vacuum (for thermal insulation purposes).

Since our ultimate goal is the build an uncooled IR focal-plane array, the bolometer design is similar to that shown on FIG. 19. The pixel size was chosen to be 50×50 µm2, a standard size allowing acceptable resolution with a chip-sized array. For this geometry, the total pixel resistance is given by:

$$R = 2R_{leg} + R_{pixel}, \quad (4)$$

assuming we can neglect contact resistances. Upon incoming radiation, most of the temperature increase occurs on the pixel. Therefore, to maximize the relative change in total resistance, the resistance of the pixel must be dominant over the resistance of the suspension legs. However, with such a layout, it is obvious that the number of electrical "squares" of the suspension legs is greater than that of the pixel (=1). For that reason, the sheet resistance of the suspensions legs must be much smaller than the sheet resistance of the pixel. The process-tunablity of the properties of pyrolyzed-parylene allows us to fabricate a bolometer meeting this requirement with a simple two-layers process. To allow comparison with VOx-based bolometers the target TCR was set around −2%, which according to FIG. 21 would be obtained for a resistivity in the order of $10^2$ Ω·cm. The width of the suspensions legs was designed to be 5 µm and their lengths varied from 50 µm to 170 µm, corresponding to a number of resistor squares varying from 10 to 34. Therefore, for the total bolometer resistance to be dominated by the pixel resistance, the resistivity of the suspension legs should be on the order of $10^{-1}$ to $10^{-2}$ Ω·cm (if the thicknesses are comparable).

A method of fabricating a bolometer sensing device according to an embodiment of the present invention can be provided below.
1. Provide a substrate (e.g., silicon wafer) comprising a surface region;
2. Form an insulating material overlying the surface region;
3. Form a film of carbon based material overlying the insulating material;
4. Treat the film of carbon based material to pyrolyzed the carbon based material;
5. Cause formation of a film of substantially carbon based material having a resistivity ranging within a predetermined range based upon at least the treatment;
6. Form an interconnect layer overlying the pyroyzed carbon based material;
7. Form a gap underlying a portion of pyrolyzed carbon based material;
8. Perform other steps, as desired.

The above sequence of steps provides a method according to an embodiment of the present invention. As shown, the method uses a combination of steps including a way of forming a bolometer sensing device using a pyrolyzed parylene bearing material or the like. Other alternatives can also be provided where steps are added, one or more steps are removed, or one or more steps are provided in a different sequence without departing from the scope of the claims herein. Further details of the present method and structure can be found throughout the present specification and more particularly below.

Our device process, FIG. 23, begins with a 5000 Å oxide growth and patterning. A 3 µm-thick parylene-C layer is then deposited and pyrolyzed in a nitrogen atmosphere. The temperature is raised to 800° C. at 10° C./min then cooled down to room temperature at 2° C./min. The resulting film is patterned to define the suspension legs. The pyrolyzed-parylene etching is done in a Technics PEII plasma etcher with 400 W, 200 mT of O2 using a photoresist mask. The etching rate of pyrolyzed-parylene was found to be comparable to that of parylene (~1800 Å/min) for these same settings. A second layer of parylene (0.8 µm) is deposited, and then pyrolyzed at 660° C. (with the same ramping parameters as previously). For better repeatability, the samples are being kept at the pyrolysis temperature for 2 hours. The second layer of pyrolyzed parylene is patterned define the pixel area. In a certain embodiment, the pyrolyzed parylene sensing element is deposited on a sacrificial layer, which is subsequently etched away to form a free standing portion of the pyrolyzed parylene sensing element. Depending upon the specific embodiment, the sacrificial layer can be made of a suitable material such as amorphous silicon, polysilicon, metal, organic material, or other materials, or combination of materials depending upon the specific application. Next, a Ti/Au interconnection layer (60 Å/2000 Å) is evaporated and patterned. Finally, the bolometers are released by $XeF_2$ gas-phase etching. FIG. 24 shows a fabricated free-standing device.

Typically, parylene depositions involve a prior coating of A174 for adhesion promotion [see Product Specifications, A-174 Silane Promotion, Specialty Coating Systems, Inc., Indianapolis, Ind., Phone: (800) 356-8260.]. However, it was found that this procedure leads to poor adhesion of the films after pyrolysis. On the other hand, the adhesion of pyrolyzed parylene on $SiO^2$/Si wafers that have not been coated with A174 was excellent. This is also part of the reasons why we chose to pattern the parylene after pyrolysis rather than the opposite. It was also observed that pyrolysis of pattern parylene leads to undesirable border effects, probably due to the pyrolysis-induced stress. Finally, due to the isotropic etching, patterning the parylene after it has been shrunk (4 to 5 times) by pyrolysis minimizes undercut.

Sheet resistance and contact resistance were measured by Greek-cross structures. The contact between the pyrolyzed parylene layers and Ti/Au was found to be ohmic with a specific contact resistance of $3.5 \times 10^{-3}$ Ω·cm$^2$ for first layer and 3.5 Ω·cm$^2$ for the second layer. The contact between the first and the second layer of pyrolyzed parylene was also ohmic with a specific contact resistance of 1.57 Ω·cm$^2$. The TCR of the second parylene layer around room temperature was measured to be −1.63%/K. Table (1) shows different characteristics of interest for the two pyrolyzed-parylene layers. The ratio between the sheet resistance of the first and the second layer is $8.7 \times 10^3$. Therefore, for the chosen geometries, the total resistance of the bolometers is indeed dominated by the temperature-sensing element obtained from the second layer of pyrolyzed parylene.

After wire-bonding and packaging, the bolometers were placed in a vacuum chamber (<1 mT) and stabilized for several hours to eliminate any potential moisture-related drift. Current-Voltage characteristics of the bolometers were measured with an HP4145 working as a voltage source/current monitor. A hold time of 1 second was used at each bias to ensure thermal steady-state. FIG. 25 shows the IV curve for a 50×50 µm$^2$ bolometer with two 5 µm×170 µm suspensions beams. The upward curvature seen on this figure indicates self-heating (the TCR of pyrolyzed-parylene being negative). Unreleased bridges do not exhibit this self-heating.

FIG. 26 shows the resistance and temperature rise as a function of input power. The temperature rise is calculated from the resistance change and TCR. The corresponding thermal conductance is $5.43 \times 10^{-8}$ W·K$^{-1}$. Knowing the dimensions of the legs, we can estimate the thermal conductivity of the first layer of pyrolyzed parylene to be $\kappa_{pp}=1.5$ W·m$^{-1}$#K−1. Similar calculations on other bolometers having different geometries (smaller suspensions legs) lead to lower thermal conductivities 1.5 W·m$^{-1}$·K$^{-1}$<$\kappa_{pp}$<1.1 W·m$^{-1}$·K$^{-1}$. This is comparable to values reported for PECVD silicon nitride [See, M. Von Arx, O. Paul and H. Baltes, *JMEMS* Vol. 9. No. 1 March 2000 136-145; and S. Hafizovic, O. Paul, *Sensors and Actuators A* 97-98 (2002) 246-252] and lower than LPCVD nitride, with the major advantage of providing electrical conductivity. It is also one order of magnitude lower than polysilicon [Angela D., et al. "Thermal conductivity of doped polysilicon layers", *Journal of Microelectricalmechanical Systems*, Vol. 10 (3), September 2001 360-369.] From the TCR and the thermal conductance, we can expect the responsivity to be $\Re = 3 \times 10^5 \ast \eta$ (for a 1 Volt bias, and 5 µm×170 µm suspension legs), where η is the absorptance of the pixel. Although the sensitivity to incoming radiation was qualitatively observed, the absorptance of pyrolyzed parylene thin films for the wavelengths of interest (e.g. 8 µm to 14 µm for thermal imaging) still needs to be characterized. However, because of the carbon-like properties of pyrolyzed parylene, we can expect the absorptance to be close to 1.

We have successfully fabricated uncooled infrared sensors with a simple two-layer pyrolyzed-parylene process. Electro thermal study shows that pyrolyzed-parylene is a promising candidate to replace silicon nitride and polysilicon for the thermal insulation, while it can also be used to achieve high-TCR thin films for the pixel. IR optical characterization as well as dynamic behavior is currently underway. Future work also includes the development of a purely surface-micromachining process, and the fabrication of a bolometer array.

In a specific embodiment, the bolometer design can have certain other features according to the present invention. That is, the bolometer has a substrate as noted above that is free from any cooling element, which is associated with drawing off heat from electron hole interactions. Here, the increase in temperature on each of the carbon based regions is from radiation influence. In certain embodiments, the interconnection of the bolometer acts as a heat sink. Depending upon the embodiment, certain colors are desired in the sensor regions, e.g., carbon based regions. That is, the carbon based material regions comprises a substantially black color to increase a radiation influence.

Also depending upon the specific embodiment, the array of substantially carbon based regions is packaged and maintained in a vacuum. In a specific embodiment, the vacuum is less than 20 millitorr but can be at other vacuums or partial vacuums. Other packaging designs also provide that the substantially carbon based regions is free from any coatings such as antireflection coating. The bolometer may also include a transparent member overlying the array of substantially carbon based material regions, which is maintained in the vacuum. The transparent member comprises a germanium, sapphire, calcium fluoride, zinc zelenide, zinc sulfide, AMITR, or other alloy to allow infrared radiation according to specific embodiments.

Although the above has been described in terms of specific embodiments, there can be other variations, modifications, and alternatives. In a specific embodiment, the predetermined range is from about $10^8$ Ohms-cm to about $10^{-3}$ Ohms-cm, other ranges can also exist, which are within our outside of the predetermined range. Additionally, each of the carbon based regions in the bolometer design may have a dimension of less than 100 µm and an area of less than $10^{-2}$ cm$^2$, although other dimensions can also exist according to other embodiments. These and other variations will be further described throughout the present specification and more particularly below.

What is claimed is:

1. Apparatus for sensing electromagnetic radiation using carbon based sensing materials, the apparatus comprising:
    a substrate comprising a surface region;
    an array of substantially carbon based material regions having a resistivity ranging within a predetermined range disposed overlying the surface, each of the carbon based material regions comprising a portion being suspended over a region of the surface to thermally insulate the portion of the suspended carbon based material;
    an insulating region formed between the region of the surface and the suspended portion of the carbon based material;
    an interconnection coupled to each of the carbon based material regions;
    one or more nodes coupled to the interconnection, the one or more nodes being able to independently read a resistivity value associated at least one or more of the carbon based material regions; and
    wherein the predetermined range is from about $10^8$ Ohms cm to about $10^{-3}$ Ohms cm.

2. The apparatus of claim 1 wherein the interconnection acts as a heat sink.

3. The apparatus of claim 1 wherein the carbon based material regions comprises a substantially black color to increase a radiation influence.

4. The apparatus of claim 1 wherein the array of substantially carbon based regions is packaged and maintained in a vacuum.

5. The apparatus of claim 4 wherein the vacuum is less than 20 millitorr.

6. The apparatus of claim 1 wherein the substantially carbon based material comprises an antireflection coating.

7. The apparatus of claim 1 further comprising a transparent member overlying the array of substantially carbon based material regions.

8. The apparatus of claim 7 wherein the transparent member comprises a germanium, sapphire, calcium fluoride, zinc zelenide, zinc sulfide, AMITR, or other alloy to allow infrared radiation.

9. A method for fabricating a sensing device, the method comprising:
    providing a substrate comprising a surface region;
    forming an insulating material overlying the surface region;
    forming a film of carbon based material overlying the insulating material; and
    treating the film of carbon based material to pyrolyzed the carbon based material to cause formation of a film of substantially carbon based material having a resistivity ranging within a predetermined range;
    forming a gap underlying a portion of pyrolyzed carbon based material; and
    wherein the predetermined range is from about $10^8$ Ohm-cm to about $10^{-3}$ Ohm-cm.

10. The method of claim 9 wherein the pyrolyzed carbon based material is Pyrolyzed parylene.

11. The method of claim 9 further comprising maintaining the film of carbon based material in an inert environment during a portion of time of the treatment.

12. The method of claim 9 wherein the insulating material is at least 1000 Angstrom in dimension.

13. Apparatus for chemical sensing using carbon based sensing materials, the apparatus comprising: a pyrolyzed parylene carbon based electrode structure having a resistivity ranging within a predetermined range, the electrode having a first end coupled to a second end and a length defined between the first end and the second end; an interconnect coupled to at least one of the ends.

14. The apparatus of claim 13 wherein the predetermined range is from about $10^8$ Ohm-cm to about $10^{-3}$ Ohm-cm.

15. The apparatus of claim 13 wherein the apparatus is a chemical sensor.

16. The apparatus of claim 13 wherein the pyrolyzed parylene carbon based material comprises amorphous carbon bearing material.

17. The apparatus of claim 13 wherein the interconnection comprises a metal layer.

18. The apparatus of claim 13 wherein the pyrolyzed parylene carbon based electrode structure may change in an electrical characteristic upon exposure of one or more chemical species.

19. The apparatus of claim 13 further comprising a reference electrode coupled to the pyrolyzed parylene carbon based electrode structure.

20. The apparatus of claim 19 wherein the reference electrode is made of a metal material.

21. The apparatus of claim 20 wherein the metal material is selected from gold, platinum, copper, aluminum or nickel.

22. A method for fabricating a sensing device, the method comprising: providing a substrate comprising a surface region; forming an insulating material overlying the surface region; forming a film of carbon based material overlying the insulating material; and treating to the film of carbon based material to pyrolyzed the carbon based material to cause formation of a film of substantially carbon based material having a resistivity ranging within a predetermined range; providing at least a portion of the pyrolyzed carbon based material in a sensor application; using the portion of the pyrolyzed carbon based material in the sensing application; and wherein the sensing application is selected from chemical, humidity, mechanical strain or temperature.

* * * * *